Patented May 12, 1942

2,282,818

UNITED STATES PATENT OFFICE 2,282,818

STABILIZED FOOD COMPOSITION

Sidney Musher, New York, N. Y., assignor to Musher Foundation Incorporated, New York, N. Y., a corporation of New York No Drawing. Application June 25, 1940,
Serial No. 342,288

7 Claims. (Cl. 99—153)

This application relates to the preparation of a macerated wheat germ composition that will have desirable and pleasing aromatic and flavor characteristics and will be adaptable for use in the manufacture of food compositions.

Large quantities of wheat germ are being disposed of for animal purposes as a by-product from the wheat milling industry. The wheat germ is not readily used in the manufacture of food compositions since it carries an objectionable strong hay or grassy odor and flavor which is imparted to other food compositions with which it may be admixed and which objectionable hay or grassy flavor becomes particularly pronounced when the wheat germ is macerated or finely ground.

An object of the present invention is therefore to prepare a macerated wheat germ composition in such a manner that it may readily be utilized for edible purposes and for addition to other foods so that the wheat germ is stabilized against development of the hay or grassy flavor.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with this invention, the wheat germ, desirably unbleached and dry milled, is macerated with specially prepared sesame seed to produce a macerated wheat germ-sesame combination that has highly desirable flavor and odor characteristics and which is satisfactory for use as a food and for addition to other food compositions. Apparently the sesame although itself not too strong in odor and flavor, removes or overcomes the objectionable flavor and odor characteristics of the wheat germ to produce a novel and acceptable macerated composition which is high in nutritive value and at the same time relatively inexpensive to prepare.

The sesame seed that is utilized in accordance with the present invention is first immersed in a salt water solution, preferably saturated, for a period of about 30 minutes to 5 hours although shorter periods may be employed dependent upon the size of the sesame seed utilized.

The sesame seeds may then be brushed by running between revolving brushes and at the same time the outer skins or hulls of the sesame may be removed. The sesame seeds are then dried to reduce the moisture content to less than 20% and desirably to less than 10%. The salted, decorticated and dried sesame seeds are then mixed with the unbleached, dry milled wheat germs and the combination of the sesame and the wheat germs is macerated into paste form by placing between iron or stone rollers so that the individual cells of the wheat germ and sesame are broken into, releasing the oil contained therein, and this rolling is continued until a fine paste is formed.

Preferably the upper roller operates at a different speed than the lower roller in order to cause a grinding and crushing operation and to macerate more thoroughly the wheat germ and sesame together so as to obtain a finely dispersed and thoroughly intermingled combination of the wheat germ and the sesame.

In the preparation of the wheat germ-sesame paste, it is desirable to use approximately one to two parts by weight of the sesame to each part of the wheat germ in order for the desired macerated composition to be obtained, although between 2 and 15 parts of sesame may be utilized for every 5 parts of the wheat germ.

The macerated wheat germ-sesame composition thus obtained in paste form has a highly desirable flavor and at the same time that the grassy or hay-like taste of the wheat germ is overcome, the bitter taste of the crushed sesame seed is likewise overcome and is replaced by a highly desirable, bland, smooth flavor.

Where less than about 35% of sesame seed is employed with wheat germ, it is desirable to add a small proportion, preferably under 25%, of a glyceride oil and preferably of sesame oil, peanut oil, or corn germ oil. The added oil will not, however, replace the sesame and is used in a minor amount only to facilitate the production of the paste.

Where, for example, a combination is made comprising 80% wheat germ and 15% salted sesame seeds, such combination, due to the low oil content of the wheat germ, will not produce a desirable maceration and it is necessary to add approximately 20% by weight of sesame oil at the time the wheat germ-sesame combination is macerated.

Larger quantities of the sesame may be used with the wheat germ such as about 70% of sesame seed with 30% of wheat germ and a desirable paste is obtained without added oil. Only where very small amounts of the sesame seed are used, the addition of oil is desirable.

The macerated wheat germ sesame combination thus obtained has a highly desirable aroma and flavor that is totally and completely different from the objectionable odor and flavor of wheat germ alone and from the flavor of sesame seeds alone.

The macerated wheat germ-sesame composition prepared in accordance with this invention may be used either alone or for addition to other food compositions such as for addition to caramels and candies, bread doughs, cakes, waffle flours, sugar syrups, peanut butter, honey, pie crust mixes, gelatin desserts, and also in the preparation of special powdered milks, chocolate milks, ice cream and cheese. This macerated composition may particularly be added to foods normally containing degerminated wheat flour and none of the objectionable characteristics of the wheat germ will appear in the prepared food.

The addition of the macerated wheat germ-sesame combination to other foods is made in amounts ranging from 1% to 25% or more, dependent upon the amount of wheat germ having the pleasing flavor and odor characteristics desired in the prepared food composition.

In addition, the macerated wheat germ-sesame combination may be utilized alone for a sandwich spread and for direct home consumption.

Where desired, the salted dehulled sesame seeds may be subjected to a light roast before being admixed with the wheat germ and macerated. For example, the sesame may be roasted at about 250° F. for from 10 to 25 minutes in order to develop a desirable roasted flavor and such sesame may then be admixed with the wheat germ and macerated.

The sesame seeds may also be expressed to remove a substantial part of the sesame oil and the cake then combined with the wheat germ. The wheat germ may also be expressed and the press cake utilized in accordance with the present invention. Under such circumstances, an additional quantity of oil must be added in order to provide a base for the grinding and to produce the desired maceration. The finished paste should contain not less than approximately 25% of glyceride oil and desirably as much as 40% to 55%.

In place of grinding the sesame and wheat germ together, the sesame seeds may, less desirably, be macerated alone and then mixed with the wheat germ, preferably in finely divided condition, and the combination then macerated again or, where the wheat germ is in macerated form as by the addition of an oil, a mixture of the macerated wheat germ and macerated sesame seeds may be made. This procedure is, however, less preferable to macerating the sesame seeds and wheat germ together as more particularly set forth.

Where desired, the wheat germ may be immersed in a salt water solution, preferably saturated, for several minutes in order to reduce the hay or grass-like flavor and odor. Following the brining, the wheat germ is dried, preferably at a low temperature.

Together with or in lieu of the wheat germ, other cereal germs may similarly be prepared in a macerated condition with the sesame seeds. Such other cereal germs include particularly corn germ and rice germ.

Together with or in lieu of sesame seeds, there may less preferably be employed de-hulled and de-shelled roasted or unroasted peanuts. The peanuts are desirably immersed in a salt water solution or otherwise salt cured followed by dehydration and combination with the wheat germ.

Where less than 40% of peanuts are used in combination with the wheat germ, insufficient oil is generally present to produce a satisfactory macerated and paste-like product. It is preferable under these circumstances to add a small proportion, preferably about 10% to 20%, of a glyceride oil such as peanut oil at the time of the grinding in order to produce the desired paste.

The product produced by this procedure is substantially stabilized against development of the hay or grassy flavor of the wheat germ and also the bitterness of the sesame seeds and so that these objectionable characteristics do not develop in the final product.

Having described my invention, what I claim is:

1. A novel stabilized food composition comprising a macerated combination of a cereal germ and a salt cured material selected from the group consisting of sesame seeds and peanuts whereby the cereal germ is substantially stabilized against oxidative deterioration.

2. A novel stabilized food composition comprising a macerated combination of wheat germ and salt cured, dehydrated, decorticated sesame seeds whereby the wheat germ is substantially stabilized against oxidative deterioration.

3. A novel stabilized food composition comprising a combination of approximately equal parts by weight of wheat germ and salt cured, decorticated sesame seeds whereby the wheat germ is substantially stabilized against oxidative deterioration.

4. A novel food composition comprising a macerated combination of wheat germ and a salt cured material selected from the group consisting of sesame seeds and peanuts whereby the wheat germ is substantially stabilized against oxidative deterioration.

5. A method of preparing a novel stabilized food composition which comprises salt curing a material selected from the group consisting of sesame seeds and peanuts, combining said material with cereal germs and macerating the combination whereby the cereal germ is substantially stabilized against oxidative deterioration.

6. A method of preparing a novel stabilized food composition, which comprises macerating a combination of wheat germ with a salt cured material selected from the group consisting of sesame seeds and peanuts whereby the wheat germ is substantially stabilized against oxidative deterioration.

7. A method of preparing a novel stabilized food composition, which comprises macerating a combination of wheat germ with decorticated, dehydrated, roasted, salt cured sesame seeds whereby the wheat germ is substantially stabilized against oxidative deterioration.

SIDNEY MUSHER.